United States Patent [19]

Clauss et al.

[11] 3,917,589

[45] Nov. 4, 1975

[54] PROCESS FOR THE MANUFACTURE OF 6-METHYL-3,4-DIHYDRO-1,2,3-OXATHIAZINE-4-ONE-2,2-DIOXIDE

[75] Inventors: Karl Clauss, Eppenhain, Taunus; Harald Jensen, Frankfurt am Main, both of Germany

[73] Assignee: Hoechst Aktiengesellschaft, Frankfurt am Main, Germany

[22] Filed: Dec. 28, 1973

[21] Appl. No.: 429,628

[30] Foreign Application Priority Data

Dec. 30, 1972 Germany............................ 2264235

[52] U.S. Cl.......... 260/243 R; 426/217; 260/543 R; 260/543 F; 260/482 R; 260/79.3 M
[51] Int. Cl.$^2$...................................... C07D 291/06
[58] Field of Search................................ 260/243 R

[56] References Cited

UNITED STATES PATENTS 3,689,486   9/1972   Clauss et al........................ 260/243

*Primary Examiner*—John M. Ford
*Attorney, Agent, or Firm*—Curtis, Morris & Safford

[57] ABSTRACT

6-Methyl-3,4-dihydro-1,2,3-oxathiazine-4-one-2,2-dioxide is prepared by reacting an acetoacetic acid tert. alkyl ester with fluorosulfonyl-isocyanate, optionally in the presence of an aprotic diluent, transforming the addition compound obtained into the acetoacetic acid amide-N-sulfofluoride by splitting off carbon dioxide and alkene at 60° to 100°C. and effecting cyclization of the fluoride with aqueous lye.

6 Claims, No Drawings

PROCESS FOR THE MANUFACTURE OF 6-METHYL-3,4-DIHYDRO-1,2,3-OXATHIAZINE-4-ONE-2,2-DIOXIDE

The present invention relates to a process for the manufacture of 6-methyl-3,4-dihydro-1,2,3-oxathiazine-4-one-2,2-dioxide.

6-Methyl-3,4-dihydro-1,2,3-oxathiazine-4-one-2,2-dioxide, its properties as sweetening agent and processes for its manufacture are described in German Offenlegungsschrift No. 2,001,017.

In the said specification is described as process B the reaction of β-keto-carboxylic acids with fluorosulfonylisocyanate (FSI) to obtain the corresponding β-keto-carboxylic acid amide-N-sulfofluorides with separation of $CO_2$ with subsequent cyclization to the dihydro-oxathiazinone dioxide.

It is known that carboxylic acids react with halogenosulfonyl-isocyanates at the carboxyl group, as shown by the example of malonic acid (cf. Wittmann et al. Mh. Chem. volume 99, page 1962 (1968)):

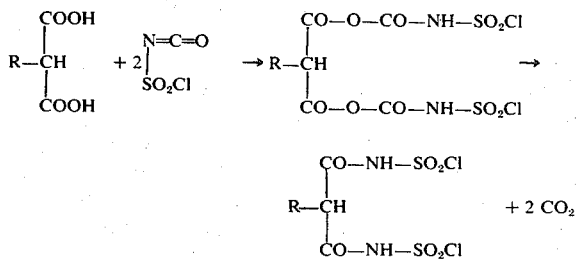

This way of reaction is impossible with carboxylic acid esters.

In German Offenlegungsschrift No. 2,001,017 there is further described as process C the reaction of β-diketones with FSI:

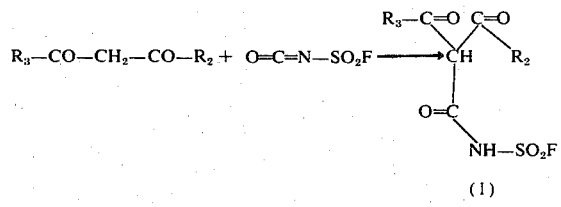

In the subsequent treatment of compound (1) with a lye cyclization takes place with formation of the dihydrooxathiazinone ring, in most cases with splitting off of one of the acyl radicals:

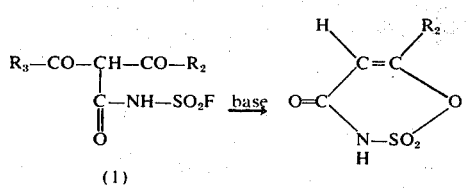

During the course of further research in this field it has been found that ketocarboxylic acid esters of the formula

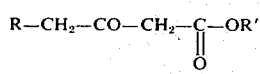

in which R is hydrogen or a lower alkyl group, for example having 1 to 3 carbon atoms, and R' is a lower alkyl group for example having 1 to 4 carbon atoms, also react with FSI at room temperature to yield products of the formula

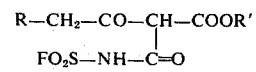

but that cyclization to the dihydro-oxathiazinone derivative by a lye treatment succeeds in exceptional cases only and with moderate yield (37 %) when using the acetoacetic acid tert.butyl ester. According to expectation the ester grouping is not split off.

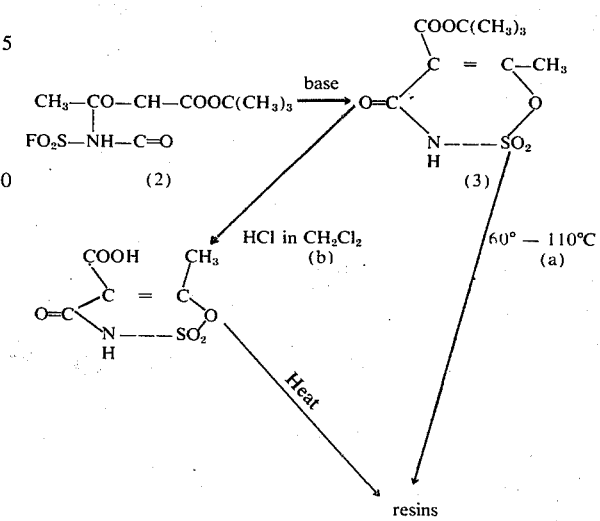

Esperiments to transform compound (3) into the desired 6-methyl-dihydro-oxathiazonone dioxide (a) by simultaneous thermal splitting off of isobutene and $CO_2$ or (b) by splitting off the tertiary butyl group by means of HCl in $CH_2Cl_2$ in known manner and heating to effect decarboxylation yielded only resins as final products which did not contain the desired product even in small amounts as ascertained by nuclear magnetic resonance spectra.

When treated with bases the reaction products of acetoacetic acid methyl or ethyl ester and FSI lose in part the $CH_3$—CO— group with transition into malonic acid ester derivatives:

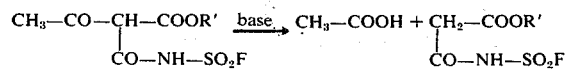

As second reaction the $SO_2F$ is removed in some cases and surprisingly a tricarbonyl-methane derivative is obtained:

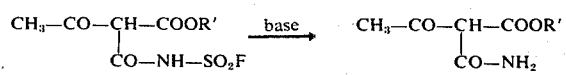

55–60 %

Hence, known and analogous processes did not allow so far to obtain the desired 6-alkyl-dihydro-oxathiazinones from acetoacetic acid esters and FSI.

The present invention provides a process for the manufacture of 6-methyl-3,4-dihydro-1,2,3-oxathiazine-4-one-2,2-dioxide by reacting an acetoacetic acid tertiary alkyl ester with fluorosulfonyl-isocyanate, transforming the addition product obtained into acetoacetic acid amide-N-sulfofluoride by splitting off carbon dioxide and alkene at a temperature of from 60° to 100°C, and effecting cyclization of the fluoride in known manner by using an aqueous lye. This surprising course of reaction was first observed with acetoacetic acid tert.butyl ester:

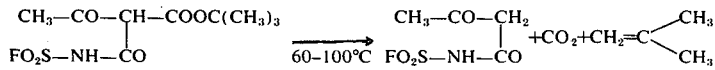

But later on it was ascertained that the reaction can be carried out quite generally with higher tertiary alkyl esters of acetoacetic acid. These can be produced easily from diketene and the corresponding tertiary alcohols preferably having from 4 to 8 carbon atoms, for example tert.amyl alcohol, dimethyl-isopropyl-carbinol or methyldiisopropyl-carbinol.

The process of the invention can be carried out stepwise with isolation of the individual reaction stages, preferably, however, it is carried out in one stage. An especially simple mode of operation is a so-called single vessel reaction in which the reactants are mixed in an aprotic diluent, the cleavage is initiated under suitable temperature conditions and terminated by further heating.

Suitable diluents for the reaction of FSI with acetoacetic acid tert.alkyl ester and for the thermal splitting of the reaction product (2) are, in general, aprotic liquids the boiling point of which should be above 60°C if the reaction is to be carried out at atmospheric pressure, for example hydrocarbons or chlorohydrocarbons, such as hexane, heptane, octane, cyclohexane, benzene, toluene, chlorobenzene, chlorotoluene, chloroform, carbon tetrachloride; ethers such as diisopropyl ether or dimethoxyethane; or esters such as ethyl acetate.

The temperature at which the reaction of the acetoacetic acid tert.alkyl ester is carried out is not critical, it can be chosen between 0° and 100°C, lower temperatures requiring longer reaction periods and at temperatures above about 50°C thermal splitting of the reaction product taking place simultaneously with the reaction with FSI.

The thermal splitting of the pure addition product (2) is vivid at 70° to 75°C. With a slightly contaminated product or over a prolonged period of time (days) it also takes place at lower temperature. The splitting can be carried out in the undiluted melt or preferably in the melt diluted with an aprotic diluent, at a temperature of from 60° to 100°C, preferable 70° to 90°C.

The order of reactions according to the invention constitutes an economic and advantageous process for the manufacture of 6-methyl-3,4-dihydro-1,2,3-oxathiazinonedioxide effective as sweetening agent. According to a preferred embodiment the acetoacetic acid tert.butyl ester is prepared in known manner from diketene, readily available at a low price by a large scale process, and the equivalent amount of tert.butanol, using triethylamine as catalyst. The ester is then reacted with FSI to yield the addition product (2) which decomposes smoothly at 60° to 100°C to acetoacetic acid amide-N-sulfofluoride, carbon dioxide and isobutene. While the isobutene obtained can be transformed in known manner into tert.butanol by hydration, the acetic acid amide-N-sulfofluoride is closed in a ring by treatment with aqueous lye in known manner to yield 6-methyl-dihydrooxathiazinone-dioxide.

The progress of the process of the invention over the state of the art can be demonstrated by a comparison with the closest process (C) in German Offenlegungsschrift 2,001,017. In the known process the expensive acetylacetone is used as starting material whereas in the present process diketene and tert.alkanol are reacted. In the treatment with alkali equimolecular amounts of acetic acid or the salts thereof are obtained in the known process besides the dihydro-oxathiazinone dioxide, whereby the isolation and purification of the desired product is complicated and the waste water is polluted. As compared therewith, carbon dioxide and alkene are obtained in the present process, the latter of which can be re-used. The transformation of the alkene into tertiary alkanol further reduces the costs for the starting materials.

In the process of the invention the yield of 6-methyl-3,4-dihydro-1,2,3-oxathiazinone dioxide is from 75 to 80 %, calculated on the diketene and it is much higher than in the process of German specification No. 2,001,017, i.e. 40 %, calculated on acetyl-acetone.

The following examples illustrate the invention.

EXAMPLE 1

37 Grams (0.5 mole) of tert.-butanol and 0.2 ml of triethylamine as catalyst were introduced into a 1 liter stirring apparatus, the mixture was heated to 65°C and during the course of 60 minutes 43.5 grams (0.5 mole) of diketene (97 %) were dropped in at an internal temperature of 65°– 70°C. The limpid mixture was heated to 65°– 70°C for a further 90 minutes, diluted with 200 ml of dry carbon tetrachloride, cooled to 25°– 30°C and 40 ml (0.5 mole) of fluorosulfonyl-isocyanate were dropped in within 15 minutes.

To effect thermal splitting off of isobutene and $CO_2$ the reaction mixture was stirred at about 70°C until the gas formation was terminated (3 to 4 hours, quantitative amount of gas). The solvent was distilled off in the water jet vacuum, 200 to 250 ml of water were added to the crystalline residue (acetoacetic amide-N-sulfofluoride) and then, while stirring and cooling with ice, 35 grams of pure burnt lime were added in portions. The turbid solution was maintained for 1 hour at 30°– 35°C and then clarified by filtration. From the very concentrated solution the calcium salt of 6-methyl-3,4-dihydro-1,2,3-oxathiazinone-2,2-dioxide was obtained in the form of a white crystalline powder.

Strong acidification of the calcium salt solution with hydrochloric acid and repeated extraction with ethyl acetate yielded 66 grams of 6-methyl-3,4-dihydro-1,2,3-oxathiazinone-2,2-dioxide (81 % of the theory), having a melting point of 123°– 124°C after recrystallization from chloroform.

EXAMPLE 2

While stirring at 70°– 75°C, 40 ml (0.5 mole) of FSI were dropped over a period of 50 minutes to a solution of 82 ml (0.5 mole) of acetoacetic acid tert.butyl ester in 200 ml of $CCl_4$. The gas separation starting during the dropwise addition was continued by maintaining the elevated temperature (2.5 hours). After splitting off of a total amount of 1.0 mole of gas (isobutene and $CO_2$) the reaction mixture was worked up as described above. 55 Grams of 6-methyl-3,4-dihydro-1,2,3-oxathiazinone-2,2-dioxide having a melting point of 117° to 122°C were obtained, corresponding to 68 % of the theory.

EXAMPLE 3

The reaction was carried out under the conditions of Example 2 with the exception that the temperature was 80° to 85°C. 54 Grams of 6-methyl-3,4-dihydro-1,2,3-oxathiazinone-2,2-dioxide were obtained melting at 117°– 122°C (67 % of the theory).

EXAMPLE 4 a. Addition compound of acetoacetic acid tert.butyl ester and FSI 80 ml (1.0 mole) of FSI were dropped at room temperature to a solution of 164 ml (1.0 mole) of acetoacetic acid tert.butyl ester in 300 ml of diethyl ether. When the reaction was terminated (control by IR spectrum), the ether was distilled off under reduced pressure. The oily addition compound crystallized on rubbing.

275 Grams of colorless crystals (97 % of the theory) melting at 52°– 53°C and decomposing as 70°– 75°C were obtained.

b. Thermal splitting of the addition compound 141.5 Grams (0.5 mole) of the addition compound prepared as described above were heated to 65°– 75°C together with 50 ml of anyone of the diluents specified below until about 1.0 mole of gas was split off. The acetoacetic acid amide-N-sulfofluoride crystallizing on cooling was isolated and dissolved portions were obtained by distillation of the solvent. After recrystallization from chloroform the product obtained melted at 87°– 88°C.

The following yields were obtained:

| with | chloroform | 81 % |
|---|---|---|
| | carbon tetrachloride | 86 % |
| | benzene | 80 % |
| | cyclohexane | 83 % |
| | ethyl acetate | 62 %. |

What is claimed is:

1. In a process for the manufacture of 6-methyl-3,4-dihydro-1,2,3-oxathiazine-4-one-2,2-dioxide by cyclization of acetoacetic acid amide-N-sulfofluoride with aqueous lye, the improvement which comprises preparing said acetoacetic acid amide-N-sulfofluoride by splitting off carbon dioxide and alkene from an addition product of acetoacetic acid tert-alkyl ester and fluorosulfonylisocyanate at a temperature of from 60° to 100°C.

2. The process as defined in claim 1, wherein an acetoacetic acid tert.alkyl ester is used, the tert.alkyl radical of which has 4 to 8 carbon atoms.

3. The process of claim 1, wherein the reaction is carried out in the presence of aprotic diluents.

4. The process of claim 1, wherein acetoacetic acid tert.butyl ester is used.

5. The process of claim 4, wherein the acetoacetic acid tert.butyl ester is obtained by reacting diketene with butanol and triethylamine as catalyst.

6. The process of claim 3, wherein the reaction is carried out in a single vessel.

* * * * *